United States Patent [19]
Stross

[11] Patent Number: 5,577,592
[45] Date of Patent: Nov. 26, 1996

[54] METHOD OF DEPLOYING A PLURALITY OF CONVEYOR SECTIONS AND A CONVEYOR SYSTEM

[76] Inventor: Lawrence L. Stross, P.O. Box 7578, Station M, Edmonton, Alberta, Canada, T5E 6K1

[21] Appl. No.: 374,045

[22] Filed: Jan. 18, 1995

[51] Int. Cl.⁶ .................................................. B65G 15/26
[52] U.S. Cl. ........................................ 198/303; 198/594
[58] Field of Search ................................. 198/300, 303, 198/588, 594, 595, 812, 861.1, 861.2, 302

[56] References Cited

U.S. PATENT DOCUMENTS

| | | | |
|---|---|---|---|
| 1,659,316 | 2/1928 | Enney | 198/594 |
| 1,706,947 | 3/1929 | Aitken | 198/594 |
| 2,850,147 | 9/1958 | Hill | 198/303 |
| 2,890,788 | 6/1959 | Hill | 198/594 |
| 4,201,156 | 5/1980 | Kuhler | 119/82 |
| 4,227,660 | 10/1980 | Denny et al. | 242/86.52 |
| 4,987,834 | 1/1991 | Peck, Jr. et al. | 104/300 |
| 5,351,809 | 10/1994 | Gilmore et al. | 198/594 X |
| 5,423,413 | 6/1995 | Gilmore | 198/594 |

FOREIGN PATENT DOCUMENTS 1373170  11/1974  United Kingdom ............... 198/861.2

*Primary Examiner*—D. Glenn Dayoan
*Attorney, Agent, or Firm*—Anthony R. Lambert

[57] ABSTRACT

A method of deploying a plurality of conveyor sections is described. Firstly, provide a first conveyor section and a second conveyor section. The second conveyor section includes a frame having a top, a bottom, opposed sides, a first end and a second end. Ground engaging wheels are rotatably mounted along the opposed sides at the bottom of the frame. A drive motor is mounted to the frame and coupled to at least one of the wheels, whereby motive force is supplied to the wheels to propel the first conveyor section. The first conveyor section includes a frame having a top, a bottom, opposed sides, a first end and a second end. The first end is downwardly sloped at the first end from the top toward the bottom. Wheel engaging tracks are positioned along the opposed sides at the top of the free. Secondly, stack the second conveyor section on top of the first conveyor section by positioning the wheels of the second conveyor section into the wheel engaging tracks of the first conveyor section. Thirdly, activate the drive motor of the second conveyor section such that the wheels of the second conveyor section travel along the wheel engaging tracks and down the downward slope at the first end of the first conveyor section.

3 Claims, 5 Drawing Sheets

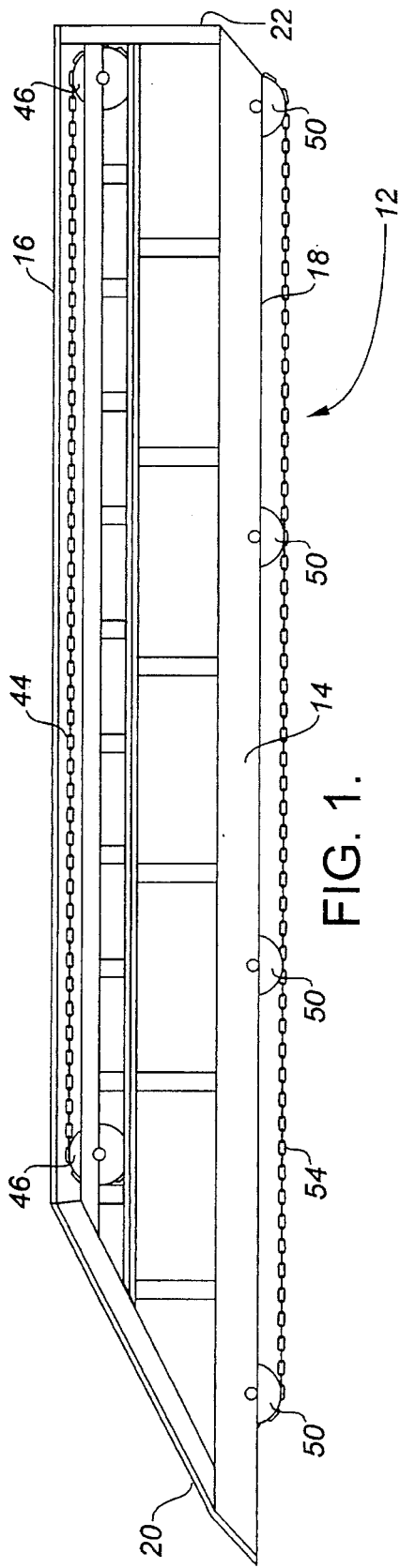
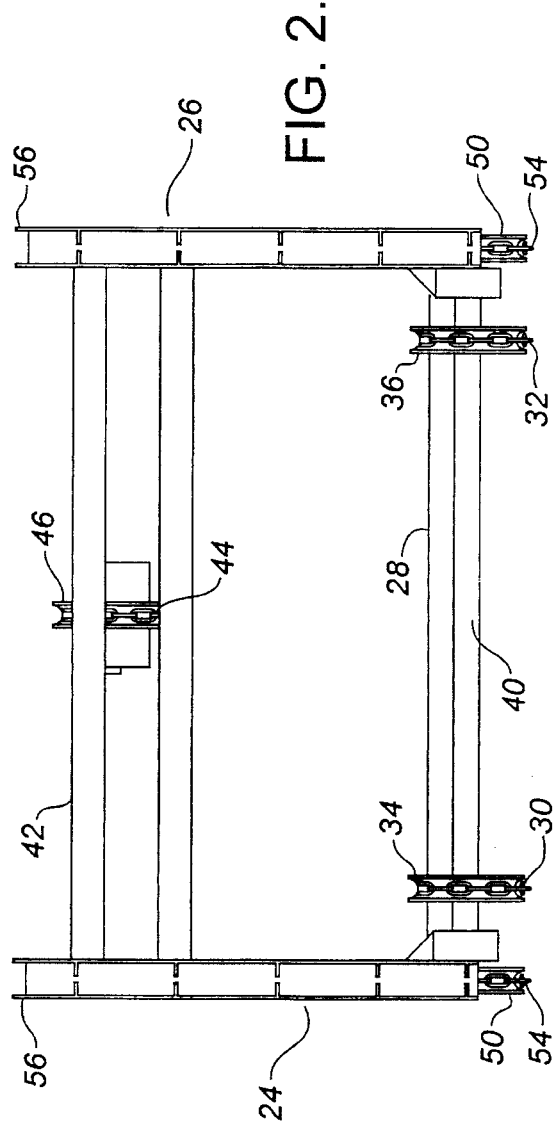

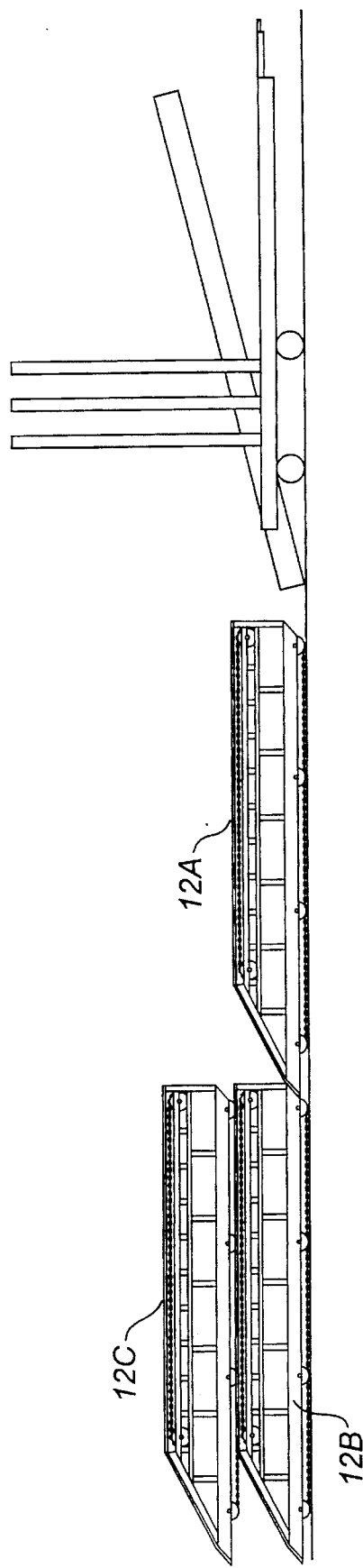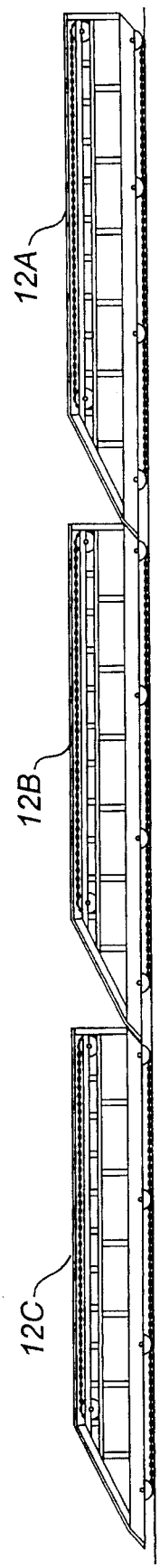

METHOD OF DEPLOYING A PLURALITY OF CONVEYOR SECTIONS AND A CONVEYOR SYSTEM

FIELD OF THE INVENTION

The present invention relates to a portable conveyor system which is intended to be rapidly deployed at a loading site.

BACKGROUND OF THE INVENTION

U.S. Pat. No. 4,201,156 which issued to Kuhler in 1980 discloses a live poultry conveying system. In accordance with the teachings of this patent, a plurality of conveyor sections are set up at a poultry farm, and are used to convey live poultry from a darkened chicken house to a crating area adjacent to a transport vehicle. A drawback of the conveyor system as taught by Kuhler is the time it takes to deploy and interconnect the plurality of conveyor sections required.

SUMMARY OF THE INVENTION

What is required is a method of deploying a plurality of conveyor sections.

According to one aspect of the present invention there is provided a method of deploying a plurality of conveyor sections. Firstly, provide a first conveyor section and a second conveyor section. The second conveyor section includes a frame having a top, a bottom, opposed sides, a first end and a second end. Ground engaging wheels are rotatably mounted along the opposed sides at the bottom of the frame. Drive means are mounted to the frame and coupled to at least one of the wheels, whereby motive force is supplied to the wheels to propel the first conveyor section. The first conveyor section includes a frame having a top, a bottom, opposed sides, a first end and a second end. The first end is downwardly sloped at the first end from the top toward the bottom. Wheel engaging tracks are positioned along the opposed sides at the top of the frame. Secondly, stack the second conveyor section on top of the first conveyor section by positioning the wheels of the second conveyor section into the wheel engaging tracks of the first conveyor section. Thirdly, activate the drive means of the second conveyor section such that the wheels of the second conveyor section travel along the wheel engaging tracks and down the downward slope at the first end of the first conveyor section.

In accordance with the described method, conveyor sections are stacked. The second or upper conveyor section has wheels driven by drive means. The drive means can be activated to move the second conveyor section down off of the first or lower conveyor section. It will be appreciated that this teaching can be applied to a plurality of stacked conveyor sections. In such a case, when the second conveyor section travels along the wheel engaging tracks and down the downward slope at the first end of the first conveyor section into a conveying position, it carries with it all remaining stacked conveyor sections. The remaining stacked conveyor sections are similarly unloaded by sequentially activating the drive means of each conveyor section in the stack until they are axially aligned in a conveying position.

In accordance with another aspect of the present invention there is provided a conveyor system which includes a plurality of stackable conveyor sections. Each conveyor section includes a frame having a top, a bottom, opposed sides, a first end and a second end. The first end is downwardly sloped at the first end from the top toward the bottom. At least one continuous conveyor extends between the first end and the second end of the frame. Conveyor drive means are mounted to the frame and coupled with the at least one conveyor whereby motive force is supplied to the at least one conveyor. Ground engaging wheels are rotatably mounted along the opposed sides at the bottom of the frame. Wheel drive means are mounted to the frame, whereby motive force is supplied to the wheels to propel the frame. Wheel engaging tracks are disposed along the opposed sides at the top of the frame.

Although beneficial results may be obtained through the use of the Conveyor system as described above, by further modifying the conveyor system it can be adapted for more rapid loading. Even more beneficial results may, therefore, be obtained when the frame supports dual conveyors. This includes a first continuous conveyor extending between the first end and the second end of the frame and a first conveyor drive means mounted to the frame and coupled with the first conveyor whereby motive force is supplied to the first conveyor. It also includes a second continuous conveyor disposed above the first conveyor and extending between the first end and the second end of the frame and a second conveyor drive means mounted to the frame and coupled with the second conveyor whereby motive force is supplied to the second conveyor.

Although beneficial results may be obtained through the use of the conveyor system as described above, it is important that each conveyor system be axially aligned in a conveying position as rapidly as possible. Even more beneficial results may, therefore, be obtained when a hook extends from the second end of the frame of each conveyor section adjacent the bottom and hook receiving means extends from the first end of the frame of each conveyor section adjacent the bottom. Extendible/retractable legs are positioned along the bottom of the frame of each conveyor section with leg actuating means being secured to the frame and coupled with the legs. The hook receiving means are coupled with a switch for the leg actuating means. When one conveyor section is stacked upon an underlying conveyor section and the ground engaging wheels are activated to propel the one conveyor section forward, as the second end of the one conveyor section passes the first end of the underlying conveyor section, the hook of the one conveyor section engages the hook receiving means of the underlying conveyor section. This activates the switch for the leg actuating means causing the legs on the bottom of the one conveyor section to move from a retracted to an extended position lifting the frame so that the ground engaging wheels no longer reach a ground surface and terminating the forward motion of the one conveyor section.

BRIEF DESCRIPTION OF THE DRAWINGS

These and other features of the invention will become more apparent from the following description in which reference is made to the appended drawings, wherein:

FIG. 1 is a side elevation view of a conveyor section constructed in accordance with the teachings of the present invention.

FIG. 2 is an end elevation view from a first end of the conveyor section illustrated in FIG. 1.

FIG. 8 is a side elevation view of a plurality of stacked conveyor sections at a second stage of deployment.

FIG. 9 is a side elevation view of a plurality of stacked conveyor sections at a third stage of deployment.

DETAILED DESCRIPTION OF THE PREFERRED EMBODIMENT

Figure 3:
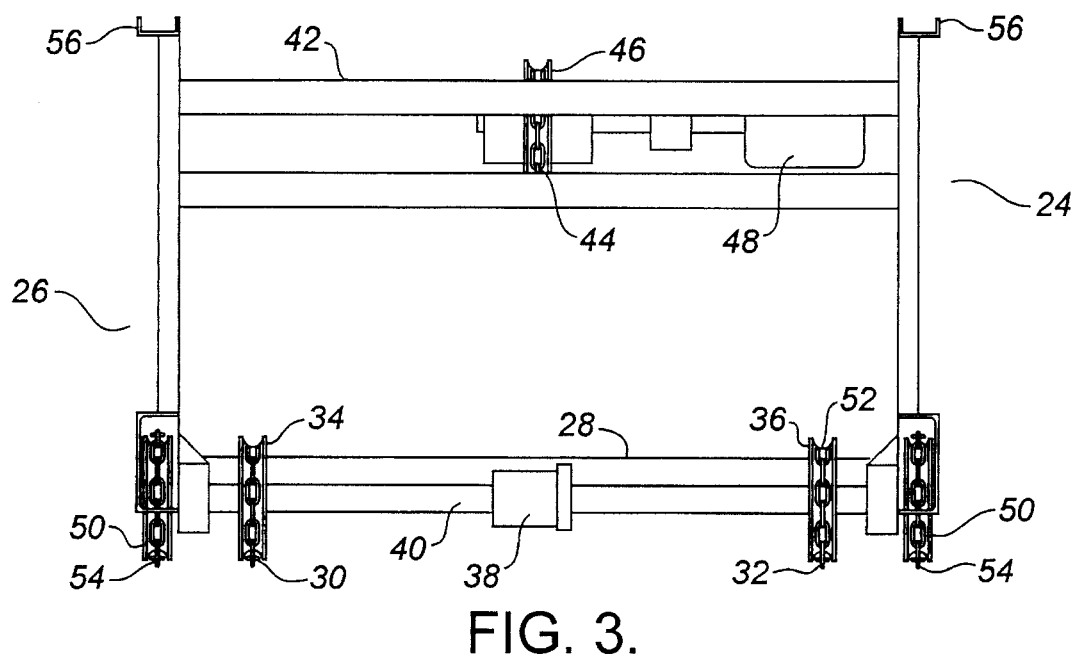
FIG. 3 is an end elevation view from a second end of the conveyor section illustrated in FIG. 1.

The preferred embodiment, a conveyor system generally identified by reference numeral 10, will now be described with reference to FIGS. 1 through 9.

Figure 4:
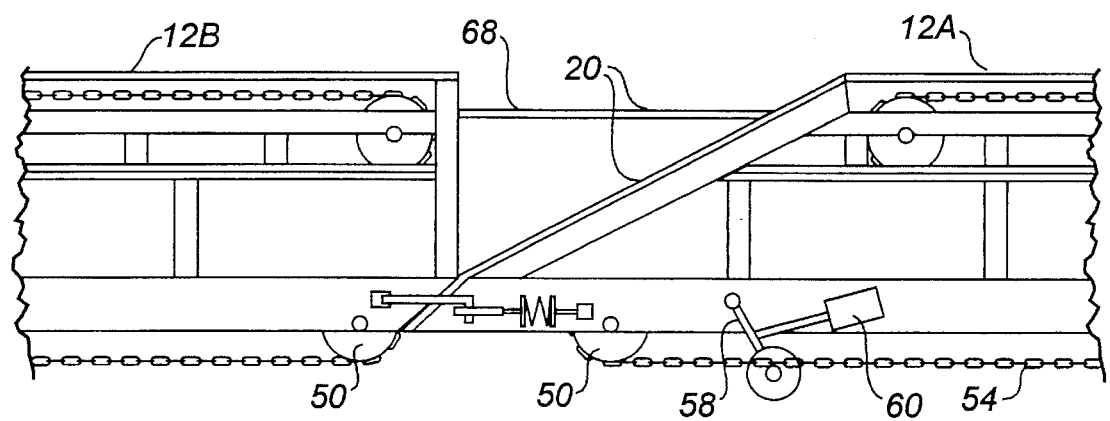
FIG. 4 is a side elevation view of two of the conveyor sections illustrated in FIG. 1, axially aligned.
Figure 5:
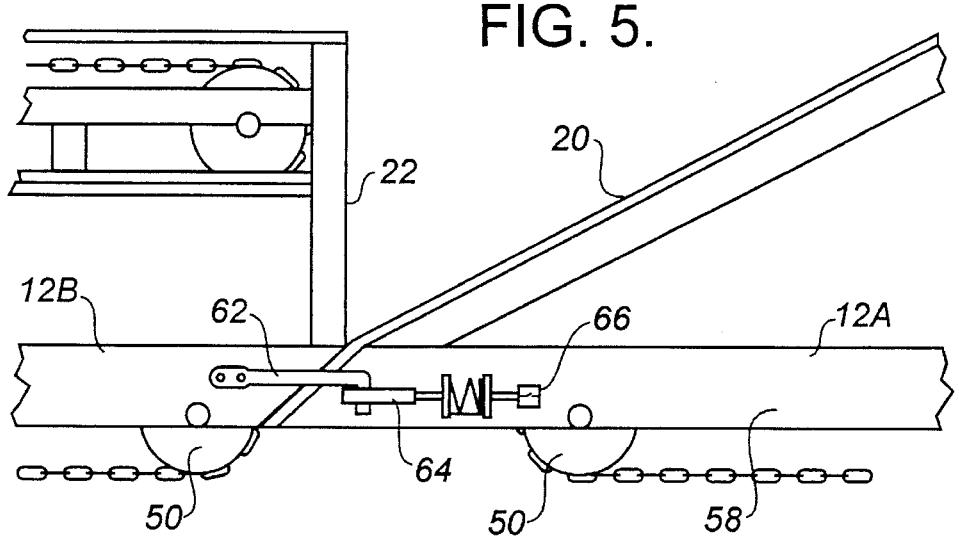
FIG. 5 is a detailed side elevation view of a connections between the conveyor sections illustrated in FIG. 4.
Figure 7:
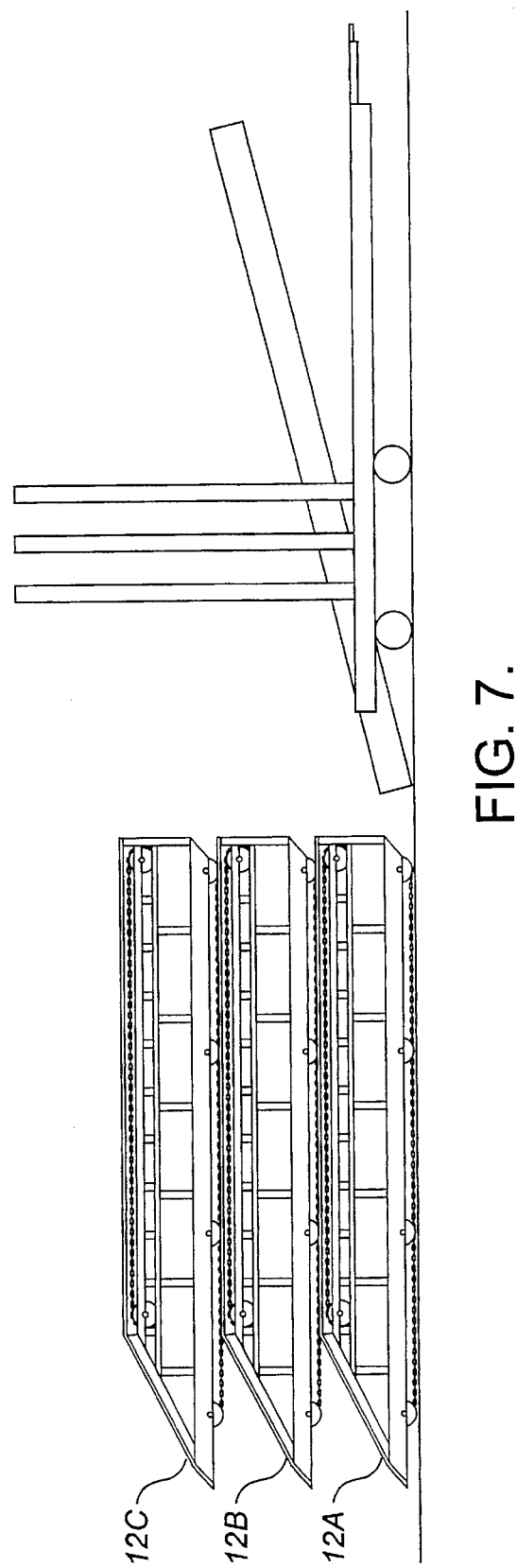
FIG. 7 is a side elevation view of a plurality of stacked conveyor sections at a first stage of deployment.

Referring to FIG. 7, conveyor system 10 includes a plurality of stackable conveyor sections. In order to differentiate between the same they have been designated as 12A, 12B, and 12C. Referring to FIG. 1, an individual conveyor section 12 is illustrated including a frame 14 having a top 16, a bottom 18, a first end 20 and a second end 22. First end 20 is downwardly sloped from top 16 downwardly toward bottom 18. Referring to FIGS. 2 and 3, frame 14 has opposed sides 24 and 26. Referring to FIGS. 2 and 3, a first continuous conveyor 28 is provided consisting of a pair of continuous chains 30 and 32 mounted over rows of pulleys 34 and 36, respectively, extends between first end 20 and second end 22 of frame 14. Referring to FIG. 3, a first conveyor drive motor 38 is mounted to frame 14 and coupled to a shaft 40 upon which one of pulleys 34 and one of pulleys 36 are mounted. Drive motor 38 provides motive force to rotate shaft 40 and via pulleys 34 and 36 continuous chains 30 and 32 of first conveyor 28. Referring to FIGS. 2 and 3, a second continuous conveyor 42, consisting of a single chain 44 mounted over a single row of pulleys 46, is disposed above first conveyor 28. Second conveyor 42 extends between first end 20 and second end 22 of frame 14. Referring to FIG. 3, a second conveyor drive motor 48 is mounted to frame 14 and coupled with one of pulleys 46 of second conveyor 42 whereby motive force is supplied to rotate chain 44 of second conveyor 42. Referring to FIGS. 1 through 3, ground engaging wheels 50 are rotatably mounted along opposed sides 24 and 26 at bottom 18 of frame 14. Wheels 50 are in the form of pulleys, as will hereinafter be further described. Two of wheels 50 are mounted to shaft 40. This means that when drive motor 38 rotates shaft 40, it also serves as part of the wheel drive system to rotate wheels 50. Drive motor 38, therefore, serves as wheel drive means providing motive force to wheels 50 to propel frame 14. Continuous chains 54 are disposed in pulley-form wheels 50. Chains 54 serve to connect all of wheels 50 so that when the two wheels 50 mounted to shaft 40 rotate, all of the other wheels 50 spaced along bottom 18 of frame 14 are also rotated. Referring to FIGS. 2 and 3, wheel engaging tracks 56 are positioned along opposed sides 24 and 26 at top 16 of frame 14. Referring to FIG. 4, pivotally mounted legs 58 are positioned along bottom 18 of frame 14 of each conveyor section 12. The pivotal mounting of legs 58 makes then extendible and retractable. An expandable leg actuating hydraulic cylinder 60 is secured to frame 14 and coupled with legs 58 and provides the force necessary to pivot legs 58. Referring to FIG. 5, a hook 62 extends from second end 22 of frame 14 of each conveyor section 12 adjacent bottom 18. A hook receiving eye 64 extends from first end 20 of frame 14 of each conveyor section 12 adjacent bottom 18. Hook receiving eye 64 is coupled with a switch 66 for leg actuating hydraulic cylinders 60. Referring to FIG. 4, upper bridge members 68 are manually positionable after deployment to connect second conveyors 42 of adjacent conveyor sections 12, identified as 12A and 12B.

Figure 6:
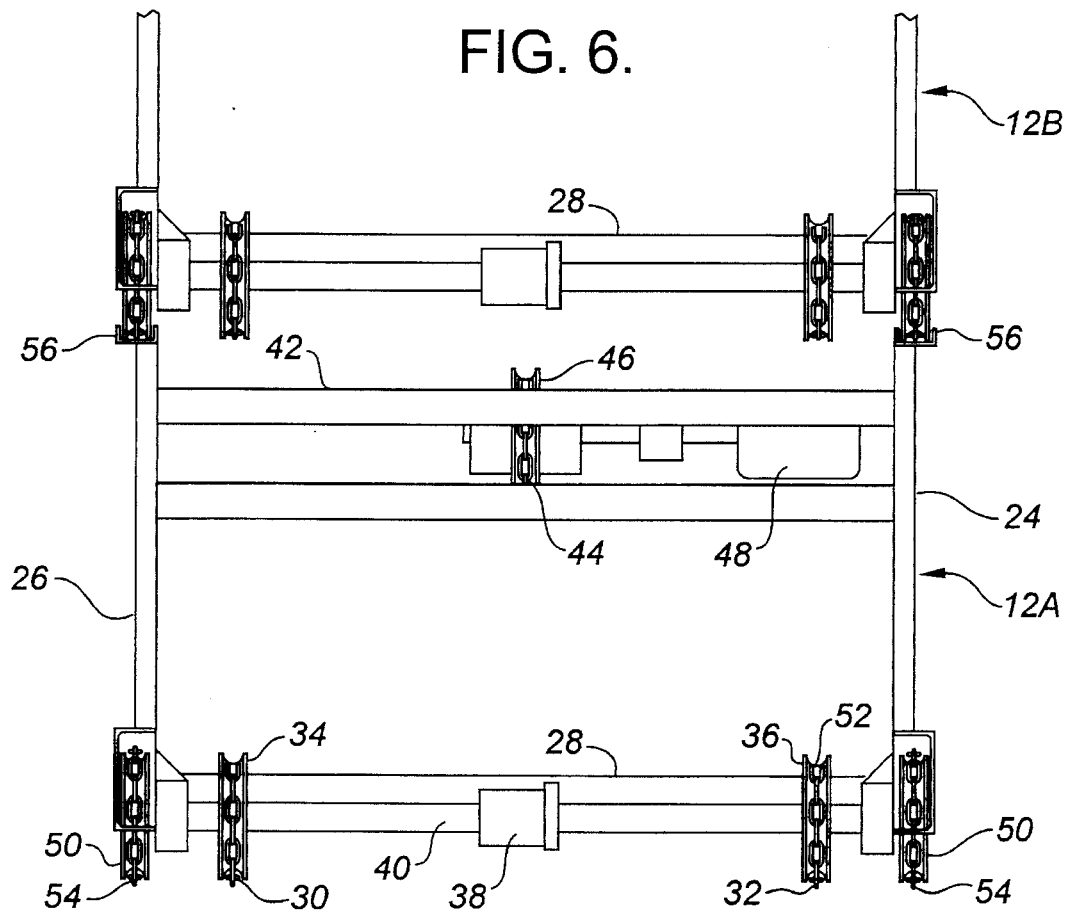
FIG. 6 is an end elevation view from a second end of two of the conveyor sections illustrated in FIG. 1, stacked.

The method of use of conveyor system 10 will now be described in relation to the preferred method of deploying a plurality of conveyor sections with reference to FIGS. 1 through 9. Firstly, provide a plurality of conveyor sections 12 as illustrated in FIGS. 1 through 5 and described above. Secondly, stack a plurality of the conveyor sections as illustrated in FIG. 7, the conveyor sections being designated as a first conveyor section 12A, a second conveyor section 12B and a third conveyor section 12C. Referring to FIG. 6, this is done by positioning wheels 50 of one of conveyor sections 12B into wheel engaging tracks 56 of an underlying one of conveyor sections 12A. Referring to FIG. 7, second conveyor section 12B is stacked upon first conveyor section 12A; third conveyor section 12C is stacked upon second conveyor section 12B. Thirdly, activate drive motor 38 of second conveyor section 12B stacked on first conveyor section 12A. Wheels 50 of second conveyor section 12B travel along wheel engaging tracks 56 and down the downward slope at first end 20 of first conveyor section 12A into a conveying position. Referring to FIG. 8, it should be noted that second conveyor section 12B carries with it third conveyor section 12C. Fourthly, sequentially activating drive motor 38 of each stacked conveyor section 12. This means that drive motor 38 of third conveyor section 12C is activated next. This causes wheels 50 of third conveyor section 12C to travel along wheel engaging tracks 56 and down the downward slope at first end 20 of second conveyor section 12B into a conveying position illustrated in FIG. 9. When the process is completed conveyors 12A, 12B and 12C are axially aligned in the conveying position.

Referring to FIG. 5, when conveyor section, such as second conveyor section 12B, is stacked upon an underlying conveyor section, such as first conveyor section 12A, and ground engaging wheels 50 are activated to propel second conveyor section 12B forward, it is preferred that some means be used to signal to second conveyor section 12B when it should stop. As second end 22 of second conveyor section 12B passes first end 20 of first conveyor section 12A, hook 62 of second conveyor section 12B engages hook receiving eyelet 64 of first conveyor section 12A thereby activating switch 66 for leg actuating hydraulic cylinders 60 causing legs 58 on bottom 18 of second conveyor section 12B to move from a retracted to an extended position lifting frame 14. When frame 14 is lifted ground engaging wheels 50 no longer reach a ground surface and the forward motion of second conveyor section 12B is terminated. Drive motor 38, however, continues to rotated shaft 40, as this drive motor 38 also provides the motive force for first conveyor 28. Once deployed conveyor sections 12A, 12B, 12C can be used to convey crates in one direction along first conveyor 28 and in the opposite direction along second conveyor 42. The system was developed for the loading of live poultry. When used for this purpose empty crates are taken from a truck equipped for hauling poultry and sent along second conveyor 42 into an enclosure housing live poultry. Live poultry are inserted into the crates. The crates loaded with live poultry are sent back along first conveyor 28 to the truck.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A conveyor system, comprising:

a plurality of stackable conveyor sections, each conveyor section including:

a frame having a top, a bottom, opposed sides, a first end and a second end, the first end being downwardly sloped at the first end from the top toward the bottom;

at least one continuous conveyor extending between the first end and the second end of the frame;

conveyor drive means mounted to the frame and coupled with the at least one conveyor whereby motive force is supplied to the at least one conveyor;

rotatably mounted ground engaging wheels along the opposed sides at the bottom of the frame;

wheel drive means mounted to the frame, whereby motive force is supplied to the wheels to propel the frame;

wheel engaging tracks along the opposed sides at the top of the frame; and a hook extending from the second end of the frame of each conveyor section adjacent the bottom, hook receiving means extending from the first end of the frame of each conveyor section adjacent the bottom, extendible/retractable legs being positioned along the bottom of the frame of each conveyor section, leg actuating means being secured to the frame and coupled with the legs, the hook receiving means being coupled with a switch for the leg actuating means, such that when one conveyor section is stacked upon an underlying conveyor section and the ground engaging wheels are activated to propel the one conveyor section forward, as the second end of the one conveyor section passes the first end of the underlying conveyor section, the hook of the one conveyor section engages the hook receiving means of the underlying conveyor section thereby activating the switch for the leg actuating means, causing the legs on the bottom of the one conveyor section to move from a retracted to an extended position and lifting the frame so that the ground engaging wheels no longer reach a ground surface and terminating the forward motion of the one conveyor section.

2. The Conveyor system as defined in claim 1, wherein the frame of each said conveyor section supports dual conveyors, including a first continuous conveyor extending between the first end and the second end of the frame; a first conveyor drive means mounted to the frame and coupled with the first conveyor whereby motive force is supplied to the first conveyor; a second continuous conveyor disposed above the first conveyor and extending between the first end and the second end of the frame; and second conveyor drive means mounted to the frame and coupled with the second conveyor whereby motive force is supplied to the second conveyor.

3. A conveyor system, comprising:

a plurality of stackable conveyor sections, each conveyor section including:

a frame having a top, a bottom, opposed sides, a first end and a second end, the first end being downwardly sloped at the first end from the top toward the bottom;

a first continuous conveyor extending between the first end and the second end of the frame;

a first conveyor drive means mounted to the frame and coupled with the first conveyor whereby motive force is supplied to the first conveyor;

a second continuous conveyor disposed above the first conveyor and extending between the first end and the second end of the frame;

second conveyor drive means mounted to the frame and coupled with the second conveyor whereby motive force is supplied to the second conveyor;

rotatably mounted ground engaging wheels along the opposed sides at the bottom of the frame;

wheel drive means mounted to the frame, whereby motive force is supplied to the wheels to propel the frame;

wheel engaging tracks along the opposed sides at the top of the frame;

extendible/retractable legs positioned along the bottom of the frame of each conveyor section;

leg actuating means secured to the frame and coupled with the legs;

a hook extends from the second end of the frame of each conveyor section adjacent the bottom;

hook receiving means extends from the first end of the frame of each conveyor section adjacent the bottom, the hook receiving means being coupled with a switch for the leg actuating means, such that when one conveyor section is stacked upon an underlying conveyor section and the ground engaging wheels are activated to propel the one conveyor section forward, as the second end of the one conveyor section passes the first end of the underlying conveyor section, the hook of the one conveyor section engages the hook receiving means of the underlying conveyor section thereby activating the switch for the leg actuating means causing the legs on the bottom of the one conveyor section to move from a retracted to an extended position lifting the frame so that the ground engaging wheels no longer reach a ground surface and terminating the forward motion of the one conveyor section.

* * * * *